C. G. RICHARDSON.
MEASURING DIAL OR INDICATOR.
APPLICATION FILED JUNE 9, 1916.
1,357,904. Patented Nov. 2, 1920.
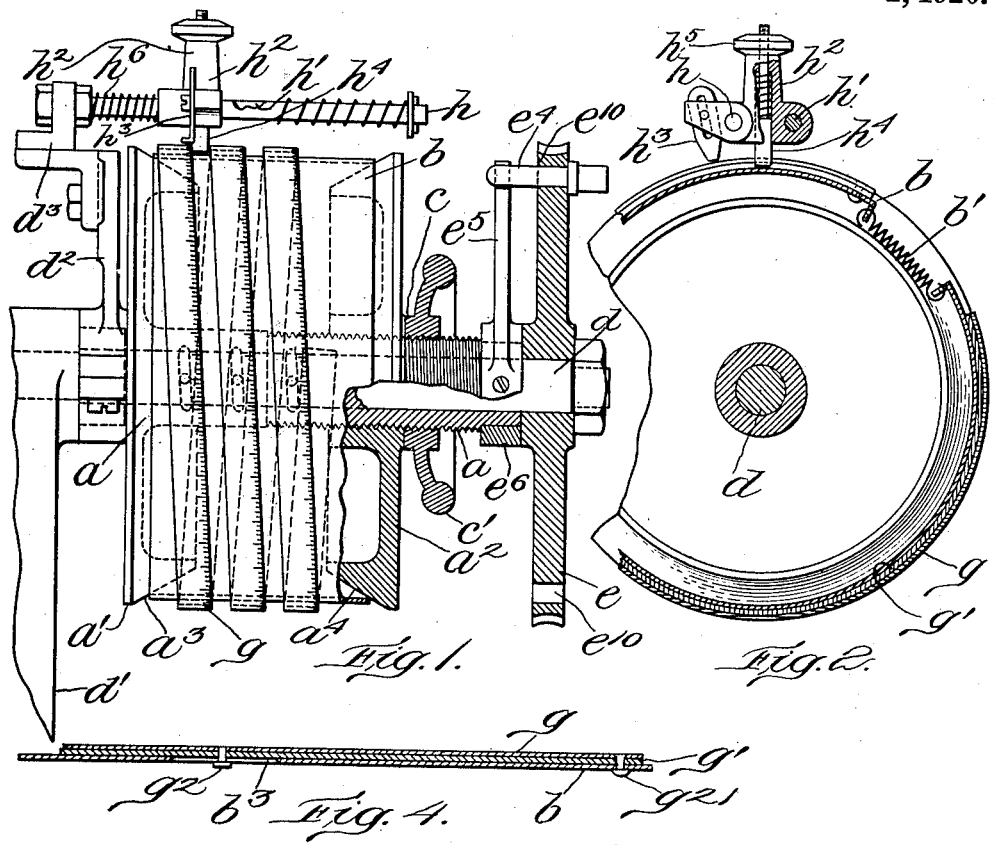
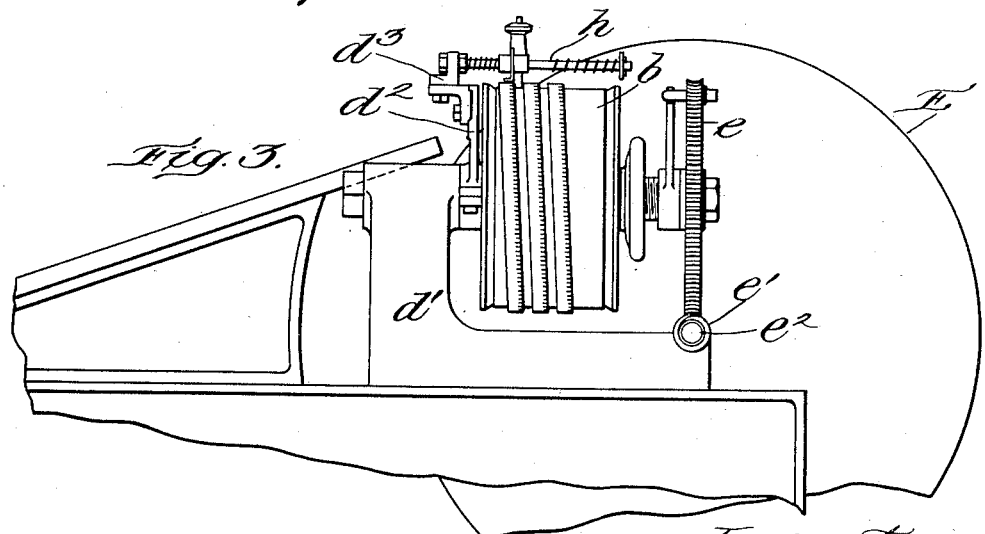
Inventor:
C. G. Richardson
by Geo. N. Goddard Atty

UNITED STATES PATENT OFFICE.

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT.

MEASURING DIAL OR INDICATOR.

1,357,904.

Specification of Letters Patent.

Patented Nov. 2, 1920.

Application filed June 9, 1916. Serial No. 102,654.

*To all whom it may concern:*

Be it known that I, CHARLES G. RICHARDSON, citizen of the United States, and resident of Springfield, State of Vermont, have invented certain new and useful Improvements in Measuring Dials or Indicators, of which the following is a specification.

This invention has relation to measuring indicators or dials of the general type set forth in my pending application for Letters Patent of the U. S. filed May 14, 1915, Serial No. 28,098, which are characterized by an adjustment for expansion and contraction by which adjustments of the measuring scale or indicator toward or away from its central axis may be effected for the purpose of compensating for variations in measurement under different conditions, such for example as is encountered in the measuring of pieces of cloth or fabric having different degrees of stretch, or having a greater or less tendency to slip on the surface of the drum of the measuring machine.

The measuring dial shown in the aforesaid application contains a single measuring scale occupying slightly less than 360° of the circle, and divided into yard indicating marks with fractions thereof, up to one hundred yards. In cases where it is desired to measure much longer pieces of cloth or fabric, say several hundred yards in length, it would be necessary with this construction either to greatly enlarge the dial wheel in proportion to the greater length of measurement desired, or to use a much finer subdivision of the scale to indicate yard intervals. Either of these courses are open to objection, the first on account of the cumbersomeness and space required by the larger dial, and the second, because of the difficulty in quickly reading fine sub-divisions of the scale.

It is the object of the present invention to provide a construction by which a dial scale or indicator shall have capacity for measuring much greater length of fabric without increasing the diameter of the rotary dial, and without unduly crowding the fractional yard marks on the scale. To this end the invention comprises an expansible and contractible supporting member on which is coiled as many turns of the measuring tape or scale as may be required to accommodate it to the length of the pieces of fabric which it is intended to measure.

These and other features of the invention will be explained in detail in this specification and will be defined in the claims annexed hereto.

In the accompanying drawings I have illustrated a simple and convenient form of construction illustrating and embodying the principles of this invention, in which—

Figure 1 is a side elevation partly in section of the assembled measuring dial or indicator.

Fig. 2 is an end elevation in central cross section.

Fig. 3 is a view on a smaller scale showing the dial indicator operatively applied to a cloth-measuring machine.

Fig. 4 is a central longitudinal section through a portion of the measuring scale member to show its opposite construction.

It will be understood that the underlying feature of construction is the equal contraction and expansion of all parts of the measuring scale toward and away from the center so that for any given angle of rotation of the measuring scale or dial, a greater or less measurement of cloth will be indicated by the dial passing a fixed point according to the greater or less distance that the measuring scale is positioned with relation to the central axis. There are however two distinct points of difference between the present construction and that of the dial wheel illustrated in my application aforesaid. One point of difference resides in the particular construction and means by which the radial expansion and contraction of the circumferential measuring scale is effected, and the other point of difference resides in the arrangement of the measuring scale by which without increasing the diameter of the drum, the measuring scale may be made of very much greater length, due to the fact that it is carried around the center several times in a helical arrangement, instead of occupying somewhat less than a single entire circumference of the drum.

In the form of construction illustrated in the drawings the rotary drum comprises a hub or sleeve *a* having at one end a circular flange or disk $a'$ forming one head of the drum, and a circular disk or head $a^2$ adapted to fit over the sleeve $a$ of the first mentioned head, and having screw threaded engagement with the sleeve $a$ whereby its rotation in one direction acts to lessen the distance between the two heads, and its rotation in the opposite direction serves to retract one head from the other, thus increasing the distance separating them. Each head is provided with an inwardly projecting flange $a^3$ and $a^4$ respectively, either, or preferably both of which is inclined or beveled toward the center for a purpose hereinafter to be described.

Supported by these internal flanges $a^3$ and $a^4$ of the drum heads or spiders, is a circumferential flexible strip $b$ preferably of sheet metal which is in the form of a wide split band or ring, normally contracted upon the supporting flanges $a^3$, $a^4$ of the spiders. Instead of relying wholly upon the spring curvature or roll of the metal strip $b$ for contracting it against the inside supporting flanges, I employ one or more contractile springs $b'$ engaging the two adjacent ends of the circumferential strip $b$ and acting to draw them together so as to keep the side edges of the drum periphery in close contact and engagement with its opposed supporting spiders.

As the head $a^2$ is advanced by a rotative movement on the central supporting sleeve or hub-member $a$, by reason of the screw-threaded connection therewith, it would be obvious that the inclined flange $a^4$ coöperating with the supporting flange on the other head, must act to expand the peripheral wall $b$ of the drum, while movement in the reverse direction allows the drum periphery $b$ to contract with all parts moving equally toward the center.

The adjustable head $a^2$ is clamped against accidental displacement by the jam-nut $c$ provided with hand-wheel $c'$ for easy manipulation.

The drum sleeve or hub-member $a$ is rotatably mounted on a stud-shaft $d$, to permit its rotation. The rotation of the stud-shaft is effected by means of the worm-gear $e$ driven by the worm $e'$ on the central shaft $e^2$ of the cloth-feeding drum E. The worm-gear is provided with a lateral projecting pin $e^4$ which engages the arm $e^5$ projecting from the hub $e^6$ which latter is adjustably clamped on the end of the rotary sleeve $a$. The purpose of this adjustment is to allow any desired adjustment or setting of the driving mechanism in relation to the rotary dial.

The measuring scale or dial proper, comprises a long flexible strip $g$ preferably of sheet metal which is graduated to indicate yard measurements and fractions thereof, and is coiled helically around the drum periphery $b$ as many times as may be desired to give the dial the requisite capacity of measurement.

In order to raise the scale somewhat from the surface of the supporting drum, it is provided with a backing $g'$ of rawhide, leather or other flexible material, and it is secured at intervals to the drum periphery $b$ by means of fastening screws or headed rivets $g^2$ which pass through slots $b^3$ formed at intervals in the drum periphery $b$, so as to allow the measuring strip or scale to shift or creep longitudinally around the supporting drum as the drum is contracted or expanded.

The fixed stud-shaft $d$ is carried in a fixed bracket $d'$ and on said stud-shaft is adjustably clamped a fixed arm $d^2$ carrying a bracket-plate $d^3$ from which project two parallel rods $h$, $h'$, which are also parallel to the stud-shaft, or the axis of rotation of the drum, and which form a stationary track or support for the traveling carriage $h^2$ to which is adjustably secured a pointer $h^3$ forming a fixed point from which the dial measurements are read.

In the traveling carriage is also mounted a spring pressed plunger $h^4$ whose lower end projects in the helical space between two adjacent coils of the measuring scale. An adjusting nut $h^5$ having screw-threaded engagement with the upper end of this plunger serves to adjustably limit the downward movement of the guide pin or plunger $h^4$ in order that it may be set to project into the groove formed by adjacent turns or coils of the measuring scale or dial, and without scraping against the bottom of such groove formed by the peripheral wall $b$ of the drum.

To the left of the carrier on the supporting or guide rod $h$ is placed a helical spring $h^6$ which acts to press the carriage $h^2$ toward the outer end of its support. On the opposite end of the rod $h$ is mounted a similar spring which presents a yielding resistance to the travel of the carriage $h^2$ along the outer end portion of the rod $h$ so as to maintain the guide-pin $h^4$ in close contact with the outer edge of the right-hand coil of the dial, to facilitate the reading of the scale marks with relation to the pointer $h^3$.

It will of course be understood that this principle of the multiple coil measuring dial is applicable to any form of contractible and expansible drum or spider. It will also be understood that while the present dial wheel or measuring indicator is shown in organized relationship to a well-known type of cloth measuring machine, nevertheless this multiple scale principle is applicable to other types of machine and other uses, wherever a capacity for extra long measurements is desired without resorting to an extremely fine subdivision of the dial or scale or to an undue enlargement of the diameter thereof.

The dial is set for measuring by turning the drum until the zero mark on the left-hand or inside coil is in register with the pointer $h^3$. The adjusting nut $h^5$ serves as a means for raising the plunger or guide-pin $h^4$ in order that the carriage $h^2$ may be shifted into position to allow the guide-pin to project into the groove between the two adjacent inner coils of the graduated dial. The arm $e^5$ forming part of the mechanism for driving or rotating the dial drum is then set to engage the projecting pin $e^4$ carried by the worm-gear $e$. As shown in Fig. 1 the worm-gear itself may be provided with a plurality of pin-receiving apertures $e^{10}$ so that the pin may be inserted in the aperture adjacent to the arm $e^5$, without readjusting the arm. The cloth is then fed over the drum E which as it rotates, drives the worm-gear $e'$, meshing therewith. The rotation causes the dial to pass by the non-rotatable pointer $h^3$ so long as the cloth continues to travel over the rotating cloth drum E. With the cessation of each measuring operation, the dial comes to rest and the pointer indicates accurately the yardage measured. If it be found on testing the machine for any class of fabric, that the measurement indicated by the dial is too large, the clamping nut C is released and the head $a^2$ is rotated so as to retract or remove it farther from the opposing head $a'$, which results in contracting the drum periphery $b$, and correspondingly contracting each coil of the scale or dial $g$ which as previously explained by reason of the pin and slot connection with the drum $b$, is free to shift or creep circumferentially around said drum to allow for such adjustment. When the proper adjustment has been found, the hand-nut $c$ serves to securely hold the adjustable head in position until further adjustment is required for other work. Near the inner or initial end of the graduated scale, a pin $g^{21}$ is used to anchor that end of the scale or dial firmly to the drum, the pin and slot connections being used for the remaining connections, so as to allow the rest of the strip to creep on the drum.

What I claim is:

1. A measuring indicator embracing in combination a rotary supporting member, a graduated scale member helically coiled around said supporting member, and means whereby said helical scale is uniformly adjusted toward or away from the central axis, substantially as described.

2. A measuring indicator embracing in combination a rotary supporting member, a graduated scale wrapped around the supporting member a plurality of times, and means whereby the entire graduated scale member is uniformly contracted toward or expanded away from the central axis for adjustment, substantially as described.

3. A measuring indicator embracing in its construction a rotary expansible and contractible drum, a helically arranged graduated scale encircling the periphery of said drum for support and adjustment and contractible and expansible with said drum, and a non-rotatable pointer mounted in coöperative relationship to said scale, substantially as described.

4. The combination of a revoluble drum having an expansible and contractible peripheral member, a helically arranged scale member encircling said drum and having connection therewith to partake of its expanding and contracting adjustment, a pointer arranged to travel in an axial direction and held against circumferential rotation in order to permit the pointer to keep in juxtaposition to the scale as it rotates, substantially as described.

5. The combination of a contractible and expansible revoluble supporting member, a measuring scale member helically coiled around said supporting member and connected thereto in order to permit it to creep circumferentially thereon as the supporting member is contracted or expanded, a movable pointer-carrying member on a stationary bracket and having continuous engagement with the edge of the scale in order to follow the successive coils of the scale member when the latter is rotated for measuring purposes, substantially as described.

6. The combination of a revoluble supporting member, a measuring scale member helically coiled around and supported upon said supporting member, a pointer member movable in an axial direction and having engagement with the edge of said scale, said pointer member being held against rotation with the scale during the measuring operation, substantially as described.

7. The combination of a revoluble supporting member, an adjustable measuring scale helically coiled around and supported by said member, a stationary bracket forming pointer support, a pointer member mounted on said bracket and movable in an axial direction, said pointer member having spring-pressed engagement with said scale to maintain it in continuous contact with the successive coils of the scale member during the measuring operation, substantially as described.

8. The combination of a revoluble drum having a peripheral member adjustable toward and away from the center by circumferential movement, a measuring scale coiled helically around the peripheral member of said drum and having sliding connection at intervals with said drum whereby the adjustment of the peripheral member operates to correspondingly contract or expand the scale member in order to vary the indicated measurement for a given angle of rotation, substantially as described.

9. The combination of a revoluble supporting member, a scale member helically coiled around said supporting member, a supporting bracket extending across the coils of said scale, substantially parallel to the axis of said revoluble member, a movable carrier mounted to slide along said bracket, said carrier having a spring-pressed guide pin projecting between adjacent coils of the scale member, and means operating on said carrier to maintain said guide pin in permanent contact with the edge of the measuring scale during the measuring operation, substantially as described.

10. An adjustable scale for measuring purposes embracing in its construction a rotatable supporting member having oppositely disposed heads adjustably interconnected to permit one head to be positioned toward or away from the other, one head being provided with an inclined supporting surface at its periphery, a peripheral expansible and contractible member supported upon said heads so as to be expanded or contracted by their aforesaid adjustment, and an encircling graduated scale surrounding said expansible member and loosely connected therewith for adjustment purposes, substantially as described.

11. An adjustable dial for measuring purposes embracing a drum having a contractible and expansible peripheral member, a graduated scale helically coiled around said peripheral member and connected therewith so as to be contracted or expanded thereby, a non-rotatable pointer-carrying member supported to travel axially of said drum and in contact with one edge of said helical scale and yielding positioning means for engaging said pointer member and maintaining it in operative relation to the graduated edge of said scale, substantially as described.

12. In an adjustable dial for a measuring machine, the combination with a contractible and expansible drum, a helically coiled scale mounted thereon and operatively connected therewith, a non-rotatable pointer arranged to travel axially of said drum and in proximity to said scale, means for rotating said drum, said rotating means being operatively connected with said drum by means of a circumferentially adjustable connection, substantially as described.

13. The combination of a drum embracing in its construction two opposed heads mounted upon a common hub, one of said heads being adjustable axially of said hub, a circumferential strip whose opposite side edges are supported by the circumferential portions of said heads, said strip being normally contracted against said heads by a yielding tension to permit its extension, and a graduated measuring scale encircling said circumferential strip and expansible and contractible therewith, substantially as described.

14. An adjustable measuring indicator embracing in its construction two opposed drum heads, one or both of which is provided with inclined bearing surfaces near the periphery, a connecting hub with which one of said heads has adjustable and locking connection to move it toward or away from the other, an encircling measuring scale of flexible material mounted with its side edges in supporting contact with inclined portions of the heads, and normally contractible thereon, to permit all portions of the drum to move equally toward the center when the heads are moved apart, substantially as described.

In witness whereof I have subscribed the above specification.

CHARLES G. RICHARDSON.

Witnesses:
B. L. NORTON,
ANNIE BEATRICE LOVELL.